United States Patent [19]

Harvey et al.

[11] 4,192,854
[45] Mar. 11, 1980

[54] PROCESS FOR REMOVING HYDROGEN SULFIDE AND AMMONIA FROM GASEOUS STREAMS

[75] Inventors: Walter W. Harvey, Bedford; Alkis C. Makrides, New Center, both of Mass.

[73] Assignee: EIC Corporation, Newton, Mass.

[21] Appl. No.: 886,282

[22] Filed: Mar. 13, 1978

Related U.S. Application Data

[63] Continuation-in-part of Ser. No. 720,345, Sep. 3, 1976, abandoned.

[51] Int. Cl.$^2$ .................. C01B 17/16; C01C 3/00; C01C 1/244
[52] U.S. Cl. .................................. 423/220; 423/238; 423/548; 423/566
[58] Field of Search .............. 423/210, 220, 225, 230, 423/231, 233, 234, 237, 561 R, 563, 566, 557, 36, 37, 548; 210/45, 59; 55/73; 60/641

[56] References Cited

U.S. PATENT DOCUMENTS

| | | | |
|---|---|---|---|
| 666,044 | 1/1901 | Barr | 423/230 |
| 740,701 | 10/1903 | Sebillut | 423/41 |
| 1,407,324 | 2/1922 | Browning | 423/463 |
| 2,215,754 | 9/1940 | Headlee | 423/220 |
| 2,609,272 | 9/1952 | Upy | 423/557 |
| 3,168,375 | 2/1965 | Barut et al. | 423/144 |
| 3,174,849 | 3/1965 | Mackiw et al. | 423/41 |
| 3,459,535 | 8/1969 | Vizolyi et al. | 423/561 R |
| 3,950,492 | 4/1976 | Haese | 423/220 |
| 3,962,402 | 6/1976 | Touro | 423/41 |
| 4,123,506 | 10/1979 | Spevack | 423/566 |

FOREIGN PATENT DOCUMENTS

| | | | |
|---|---|---|---|
| 350591 | 10/1919 | Fed. Rep. of Germany | 423/220 |
| 802284 | 1/1967 | United Kingdom | 423/220 |

*Primary Examiner*—O. R. Vertiz
*Assistant Examiner*—Gary P. Straub

[57] ABSTRACT

A process is described for the simultaneous removal of $H_2S$ and ammonia from gaseous streams containing other acid and basic gases. The process comprises closed loop scrubbing of the gaseous stream with a copper sulfate-ammonium sulfate solution to yield a copper sulfide precipitate, concurrent neutralization of the acidity generated in the scrubbing step by addition or scrubbing of ammonia and other basic gases, separating the precipitate, hydrothermally leaching the precipitate with oxygen or air under controlled temperature and pressure to reoxidize the sulfide to copper sulfate, recycling the copper sulfate to the scrubber, and rejecting sulfur from the system in the form of $(NH_4)_2SO_4$.

11 Claims, 5 Drawing Figures

PROCESS FOR REMOVING HYDROGEN SULFIDE AND AMMONIA FROM GASEOUS STREAMS

This is a continuation-in-part of our copending application Ser. No. 720,345, filed Sept. 3, 1976 now abandoned.

This invention relates to the removal of hydrogen sulfide and ammonia from gas streams and more particularly to the removal of those constituents from a variety of gas streams, including but not limited to geothermal steam and chemical process gas streams such as coke oven gases.

$H_2$ is highly odorous, toxic and corrosive and its presence in other than negligible quantities in gas streams vented to the atmosphere presents a serious problem in terms of environmental and aesthetic norms. Hence, it is desirable to substantially eliminate $H_2S$ gas streams vented to the atmosphere.

Geothermal fluids in the form of naturally-occurring steam or steam obtained from hot brines represent a relatively inexpensive source of electrical power. These fluids commonly contain hydrogen sulfide and a number of other gaseous constituents in varying concentrations, e.g., carbon dioxide, methane, hydrogen and nitrogen. Ammonia and boric acid are often present in naturally-occurring steam, i.e., geyser steam, and in brines. Reduction of $H_2S$ emission is essential if geothermal fluids are to become an important source of energy in the future.

Current technology for removing $H_2S$ from chemical process gas streams is generally based on scrubbing $H_2S$ by a basic solution. Such scrubbing processes are generally non-specific, that is, they tend to remove to a greater or lesser extent, other acid gases, for example, $CO_2$. When removal of only $H_2S$ is desired, absorption of other gases is generally minimized by various modifications which generally result in considerable increase in capital and operating costs and/or a decrease of the extent to which $H_2S$ is removed from the gas stream. Furthermore, current technology is not applicable to gases at elevated temperatures, for example to steam, since the active reagents or the products of the active reagents and $H_2S$, decompose or volatilize at relatively low temperatures. Cooling of the gas stream to be purified introduces additional expense and in some cases, steam for example, is not practical. There exists, therefore, a need for a practical technology which is specific to $H_2S$, which can be applied to hot gases, and which can purify streams containing from a few parts per million of $H_2S$ to several percent.

Current technology for $H_2S$ removal from gas streams is not applicable to geothermal plants for various reasons. As a general rule, the conditions characteristic of geothermal steam are unfavorable with respect to established and accepted $H_2S$ removal techniques. For example, the Clause Process, which has been used industrially for many years, is only applicable to gas streams containing at least 20% $H_2S$. Other methods (e.g., the Rectisol Process) cannot operate in steam since the active reagents are water soluble or have boiling points below 100° C. Solid absorbents for $H_2S$, e.g., calcium carbonate (as dolomite), calcium oxide, zinc oxide, and iron oxide cannot be used either because of solubility or slow kinetics at operating temperatures. Still other technology for $H_2S$ removal which does not permit economical and efficient cleaning of geothermal emissions is exemplified by P.A. Ferguson, Hydrogen Sulfide Removal from Gases, Air and Liquids, Pollution Technology Review No. 22, published by Noyes Data Corporation, Park Ridge, N.J.

Employment of the useful properties of cupric sulfate to remove $H_2S$ from gaseous streams by precipitation of copper sulfide has not been practical up to now in a larger-than-laboratory-scale plant, in spite of the fact that this reaction has been known for almost 200 years. The main problems which have prevented use of this reaction in a practical fashion have to do with control of acidity generated when copper sulfide is precipitated and with regeneration of the copper sulfide so that the process can be operated as a closed loop. Operation in a closed loop fashion is mandatory, except in exceptional circumstances, if the process is to be economically viable.

The theoretical reaction for scrubbing $H_2S$ with $CuSO_4$ can be written as:

$$H_2S(gaseous) + CuSO_4(aqueous) \rightarrow CuS(ppt) + H_2SO_4(aqueous) \tag{1}$$

although, as a matter of fact, the composition of the precipitate is more accurately represented as $Cu_{1+x}S$ with x between 0 and 1. During scrubbing, the copper sulfate solution becomes an acidic slurry comprising copper sulfide solids suspended in a copper sulfate solution. For continuous operation, a purge stream must be removed to a regeneration stage where copper sulfide is separated and regenerated.

German Pat. No. 350,591 suggests that regeneration may be carried out by converting the cupric sulfide into sulfate by oxidation through sedimentation with oxygenous gases under pressure and with heat. An as example, it is stated that air at 100° C. and 50 atm pressure will convert the sulfide to the sulfate in 1 hour. The regeneration reaction may be written as:

$$CuS(ppt) + 2O_2(gaseous) \rightarrow CuSO_4(aqueous) \tag{2}$$

and the overall reaction, combining Equation (1) and Equation (2), for closed loop operation may be written as:

$$H_2S(gaseous) + 2O_2(gaseous) \rightarrow H_2SO_4(aqueous) \tag{3}$$

Thus, German Pat. No. 350,591 teaches that closed loop scrubbing can be used to produce strong sulfuric acid.

However, operation of a closed loop process as described by German Pat. No. 350,591 turns out to be impractical and, in fact, not possible in a continuous manner. The difficulties arise both from kinetic and thermodynamic reasons. Continuous generation of acid eventually leads to instability, in a thermodynamic sense, of the copper sulfide precipitate and reaction (1) is no longer useful as a scrubbing reaction. However, long before this occurs, kinetic effects make the scrubbing process inefficient and, consequently, of little practical value.

One possible way of curing this defect is presented by J. D. F. Marsh and J. Rich in British Pat. No. 802,284. This patent concerns a method for the simultaneous removal of $H_2S$ and HCN from fuel gas by washing the gas with a neutral or slightly acidic solution of copper sulfate and regenerating the precipitate by roasting to produce copper oxide and a gas containing oxides of sulfur. In a particular embodiment of this reaction, the roasting of the precipitate is controlled so that the sulfur removed as oxides of sulfur in the roasted gases is just equal in quantity to the hydrogen sulfide removed from the gas as copper sulfide. The copper oxide produced in the roasting process is dissolved in the slightly acidic copper sulfate solution for reuse as the wash liquor. The combination of these steps yields a closed loop process with control of acidity which can be used to remove H$_2$S and HCN from gas streams.

However, the process disclosed by Marsh et al suffers from the disadvantage that oxides of sulfur are produced. In particular, when H$_2$S is to be removed so as to avoid environmental discharges which are unacceptable, the net result of this process is to produce sulfur oxide emissions which are equally unacceptable. Therefore, to satisfy environment protection requirements, a scrubbing process for oxides of sulfur must be operated sequentially with the copper sulfate scrubber (for removal of H$_2$S), with accompanying penalties in cost and operability.

Another disadvantage of the process of Marsh et al is that while it provides means for neutralizing in a stoichiometric way acid produced by absorption of H$_2$S, the neutralization step occurs separately from the generation of acid. Accordingly, acidity generated in the scrubbing reaction leads to an acid solution in the scrubber and hence to poor efficiency of H$_2$S removal when the process is operated in a continuous, closed loop fashion. To cure this defect, large volumes of wash liquor must be used so as to keep the increase of acid concentration in the scrubber at a minimum. A high ratio of scrub liquor to gas scrubbed leads to significant increases in capital equipment costs and operating expense.

The reasons outlined above seem to be responsible for the unavailability of practical systems employing copper sulfide precipitation for scrubbing H$_2$S from gas streams.

Accordingly the primary object of this invention is to provide an improved method and system for removing hydrogen sulfide from a variety of gaseous streams, including but not limited to geothermal steam and chemical process gas streams such as coke oven gases. Another important object is to provide an economically viable method and system for removing hydrogen sulfide from such gaseous streams.

A further important object is to provide a practical closed loop method and system for scrubbing hydrogen sulfide from gaseous streams by means of copper sulfide precipitation.

A more specific object is to provide an economical and efficient method and system for simultaneously removing hydrogen sulfide and ammonia from gaseous streams such as a stream of coke oven gases or geothermal steam.

Still another object is to provide a method of the character described which is particularly useful for removing hydrogen sulfide from steam containing less than about 100 ppm of NH$_3$.

Another specific object of this invention is to provide an H$_2$S emission control system for geothermal power plants which involves a novel method of treating the steam (regardless of whether it is a dry steam, i.e., a naturally occurring geothermal steam or a flashed steam derived from a geothermal brine) directly to effect removal of H$_2$S. A further specific object is to provide a method and system of the character described whereby the steam is treated for H$_2$S removal in advance of feeding it to the power-generating turbine (or the binary-cycle heat exchanger in the case where the steam is used to heat a secondary working fluid).

Still another object is to provide a closed loop method of treating fluids to effect H$_2$S and ammonia removal which does not require the design of new and exotic equipment.

Further objects are to provide a method for effecting H$_2$S removal from gaseous streams from chemical plants and geothermal power plants which overcomes at least some of the limitations of existing technology and enables such plants to operate without discharging relatively large quantities of H$_2$S into the atmosphere.

Still another specific object is to provide a method which comprises removing H$_2$S from a gaseous stream by precipitating copper sulfide, leaching the copper sulfide to produce copper sulfate, and utilizing the sulfate to remove additional H$_2$S by additional metal sulfide precipitation.

The foregoing objects are achieved by closed loop scrubbing of the gas stream with a copper sulfate-ammonium sulfate solution so as to produce a copper sulfide precipitate in a slurry, concurrently neutralizing the acidity generated in the scrubbing step by addition or scrubbing of ammonia, separating the precipitate and slurry from the stream, leaching the precipitate with oxygen to regenerate copper sulfate, recycling the resulting copper sulfate solution to the scrubber and rejecting sulfur from the system as (NH$_4$)$_2$SO$_4$. Other features and advantages of this application of the invention are set forth in the following description which is to be considered with the accompanying drawings wherein like numbers identify like apparatus and:

Figure 1:
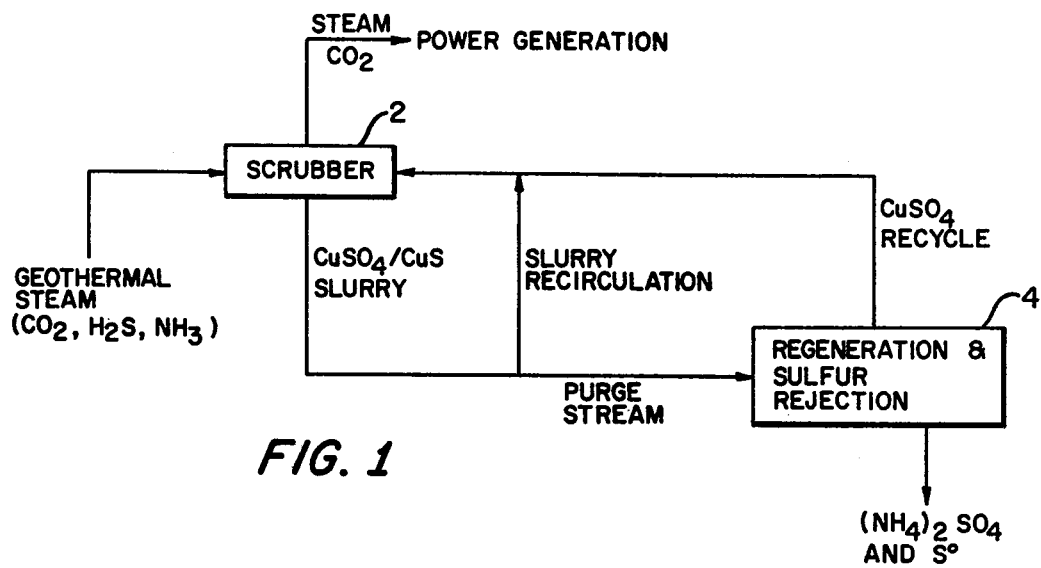
FIG. 1 is a simplified flow chart illustrating application of the invention in a generalized manner.

The thermodynamics of precipitation of copper sulfide are generally well understood. On the basis of known thermodynamic quantities, it may be asserted that reaction (1), i.e.:

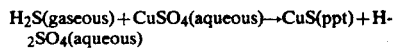
$$H_2S(gaseous) + CuSO_4(aqueous) \rightarrow CuS(ppt) + H_2SO_4(aqueous)$$

will proceed essentially to completion even in strongly acid solutions, for example, 20% H$_2$SO$_4$. However, even in much more dilute solutions, reaction kinetics limit the rate to such an extent that the reaction is not practically useful for scrubbing H$_2$S. The precise reason for slow kinetics is not known, but in the development of this invention it has been ascertained that apparently acidity has a significant effect on the rate at which H$_2$S can be made available for reaction with dissolved copper sulfate.

The net effect of acidity is to decrease the efficiency of H$_2$S removal for given rates of flow of the gas and the scrub solution. Thus, successful operation of the copper sulfate scrubbing process depends on control of pH in the scrubber. pH control can be achieved in a variety of ways. In a practical sense, the scrub solution pH must be controlled within a range whose upper limit is the pH where copper salts begin to precipitate as hydroxides or basic hydrated oxides and the lower limit is defined by the minimum pH required to maintain a high rate of absorption and reaction of $H_2S$. The scrub solution should preferably be buffered within this range so that local excursions of pH, particularly at the absorbing gas-liquid interface, are minimized or eliminated. For most gas streams including geothermal steam and coke oven gases, the pH of the scrub solution should be between about 1 and about 3 measured at room temperature, i.e. 20° C. For geothermal steam, which generally must have a temperature between about 270° F. and 400° F. to assure that it has adequate pressure to drive a turbine, the pH measured at room temperature preferably is between about 1.0 and about 2.0. On the other hand, for coke oven gases, which generally are at a temperature of between about 150° F. and 200° F., the pH measured at room temperature preferably is between about 1.5 and about 3.0. Neutralization of generated acid must not add significantly to the operating costs and must not interfere with regeneration of copper sulfate from sulfides of copper. We have found that if ammonium sulfate is maintained in the scrub solution, or free ammonia is added to the gas stream to be purified, we can buffer and control the pH within the desired range as well as neutralize the overall acid generated during precipitation of copper sulfide. Furthermore, since gas streams to be purified often contain ammonia, conditions can be selected where substantially all or most of the needed ammonia and ammonia sulfate are provided from what is already present in the gas stream and additional ammonia is only needed to the extent that naturally occurring ammonia is insufficient to neutralize acid generated in the overall process.

Ammonia sulfate in the scrub solution can be made to buffer the pH in the range of 1 to 3, measured at room temperature, according to the following equilibrium:

$$(NH_4)_2(SO_4) + H_2SO_4 \rightleftharpoons 2(NH_4)HSO_4 \qquad (4)$$

The pH of the scrub solution is controlled by proper additions of $(NH_4)_2SO_4$ and $H_2SO_4$.

Proper choice of pH permits near quantitative absorption of ammonia according to the reaction:

$$NH_3(gaseous) + H_2SO_4(aqueous) \rightarrow (NH_4)HSO_4 \qquad (5)$$

The pH needed for this scrubbing reaction is compatible with the pH required for efficient removal of $H_2S$. Accordingly, concurrent scrubbing of $H_2S$ and ammonia is feasible by a copper sulfate solution buffered at the appropriate pH by $(NH_4)_2SO_4$ and $H_2SO_4$, with the result that buffering is maintained and the acid generated by absorption of $H_2S$ is neutralized by ammonia absorbed from the gas stream.

The scrubbing reactions can be written formally as:

$$H_2S(g) + CuSO_4(sln) + 2NH_4HSO_4(sln) \rightarrow CuS(s) + (NH_4)_2SO_4(sln) + 2H_2SO_4(sln) \qquad (6)$$

and for ammonia:

$$2NH_3 + 2H_2SO_4 \rightarrow 2NH_4HSO_4 \qquad (7)$$

so that the overall scrubbing reaction is:

$$H_2S(g) + 2NH_3(g) + CuSO_4(sln) \rightarrow CuS(s) + (NH_4)_2SO_4(sln) \qquad (8)$$

Since $(NH_4)_2SO_4$ can be recovered from the purge stream, any ammonia added to the gas stream to achieve a stoichiometric ratio between $NH_3$ and $H_2S$, i.e., a molecular ratio of $2NH_3$ to $1H_2S$, is recovered as $(NH_4)_2SO_4$, a useful product of approximately equal value on a comparable basis as free ammonia.

$(NH_4)_2SO_4$ removed in the purge stream is present during hydrothermal leaching of copper sulfide. However, we have found that $(NH_4)_2SO_4$ does not interfere either with the extent or rate of copper sulfate regeneration and hence does not impose any penalties on the economics of the overall process either through losses of scrubbing salts or changes in regeneration conditions.

EXAMPLES OF APPLICATION OF THE PROCESS

1. Application to Scrubbing of Geothermal Steam

In a typical geothermal power plant, the sequence of operations involves steam condensation (after driving the power generating turbine or passing through a binary cycle heat exchanger where it heats up a secondary working fluid which is vaporized to drive the turbine), venting of non-condensables, and production of cooling water from the condensate in a cooling tower. The bulk of the condensate is evaporated during cooling and the overflow (generally about 20%) may be returned underground. About one-third of the hydrogen sulfide contained in the steam remains in the gas phase during condensation and is discharged at the gas-ejector vents, while the remainder dissolves in the condensate and is stripped from the solution in the cooling tower. Hence, even if little or no $H_2S$ escaped to the atmosphere via the gas-ejector vents, more than half of the $H_2S$ content would still be emitted from the cooling tower. This is intolerable in view of the fact that the average concentration of $H_2S$ in geothermal steam and brines is in the order of about 250 ppm. It has been estimated that a geothermal power plant using about 9,000,000 pounds of steam hourly (to produce about 500 megawatts of electricity) will discharge approximately 24 tons of $H_2S$ daily.

By its chemical nature, $H_2S$ will distribute itself between non-condensable vent gas and condensate, so that removal of $H_2S$ from only one effluent stream is not an adequate emission control measure for geothermal power plants. While it is possible to remove $H_2S$ from condensate, liquid phase removal processes are not practical or economically viable in geothermal power generation. Concentrations are low due to dilution by cooling water, so that driving forces are low, reagent consumption is high, and liquid solid separation problems are formidable. Furthermore, reagents used to promote $H_2S$ oxidation inherently cause corrosion in materials of construction used in normal cooling systems.

As shown in FIG. 1, $H_2S$ removal from steam by this invention is effected by passing the geothermal steam through a scrubbing stage 2 where it is scrubbed with a dilute copper sulfate solution under conditions which will cause precipitation of copper sulfide according to the reaction (1), i.e.

$$H_2S(\text{in steam}) + CuSO_4(\text{aqueous}) = CuS(\text{ppt}) + H_2SO_4(\text{aqueous})$$

The copper sulfate scrubbing solution thus tends to become an acidic slurry comprising copper sulfide solids suspended in a copper sulfate solution. Some of this slurry is recirculated to the scrubber while the remainder is passed as a purge stream to a regeneration stage 4 where it is treated to regenerate copper sulfate. The regenerated salt solution is recycled to the scrubber. Scrubbing removes at least 90% of the H$_2$S content of the steam, with the result that the scrubbed steam may be used without further treatment for the generation of power. The steam undergoes a small but acceptable loss of enthalpy during scrubbing.

Figure 2:
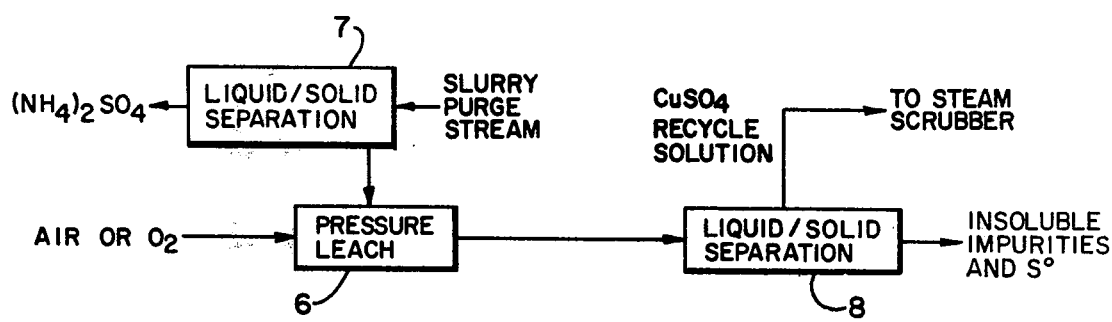
FIG. 2 is a simplified flow chart illustrating how the copper sulfate scrubbing solution is regenerated.

The copper sulfate solution is regenerated by leaching the finely divided sulfide precipitate in the copper sulfate/copper sulfide slurry under controlled temperature and pressure conditions. As illustrated generally in FIG. 2, the regeneration process involves passing the copper sulfate/copper sulfide slurry purge stream to a pressure leach stage 6 where it is leached with oxygen according to reaction (2), i.e.:

$$CuS(\text{solid}) + 2O_2(\text{aqueous}) = CuSO_4(\text{aqueous})$$

By way of example, reaction (2) can be made to proceed by carrying out the leaching operation at temperatures of about 100° C. (212° F.) to about 200° C. (392° F.) and an oxygen pressure of from about 20 to about 100 psi.

The leaching reaction product stream is passed to a liquid/solid separation state 8 to remove insoluble materials and then it is recycled back to the scrubber according to the scheme in FIG. 1.

Ammonia in the geothermal steam feed is absorbed in the scrubber according to the following acid-base reaction:

$$2NH_3(\text{in steam}) + H_2SO_4(\text{aqueous}) = (NH_4)_2SO_4(\text{aqueous}) \quad (9)$$

The ammonia sulfate is separated out as part of the purge stream in stage 7. Since the equilibrium and rate for ammonia absorption are not favorable unless the pH is below about 3 (measured at room temperature), the pH of the scrubbing liquor measured at room temperature should be below this value. Fortunately CuS is insoluble at pH's greater than 0 and at the usual temperature at which geothermal steam or steam derived from brines is available for power generation. Hence, in summary, the overall chemical reaction for the scrubbing process is as follows:

$$CuSO_4 + H_2S + 2NH_3 + CuS + (NH_4)_2SO_4 \quad (10)$$

at a pH of about 1 to about 3 measured at room temperature. In order to control the pH within this range, (NH$_4$)$_2$SO$_4$ is added to the scrub solution as illustrated in the typical example given below.

The scrubbing operation is conducted at a temperature in the range of from about 130° to about 190° C. since that is the normal range of temperatures for geothermal steam after recovery above ground and also for steam produced from geothermal brines. For obvious reasons such as to maximize power plant efficiency, it is desirable to avoid having to reduce the temperature of the impure steam before it is used to drive a turbine or to heat up a secondary working fluid. Typically raw geothermal steam is at a temperature of about 170° C. and steam produced from geothermal brine is usually at about the same temperature.

Figure 3:
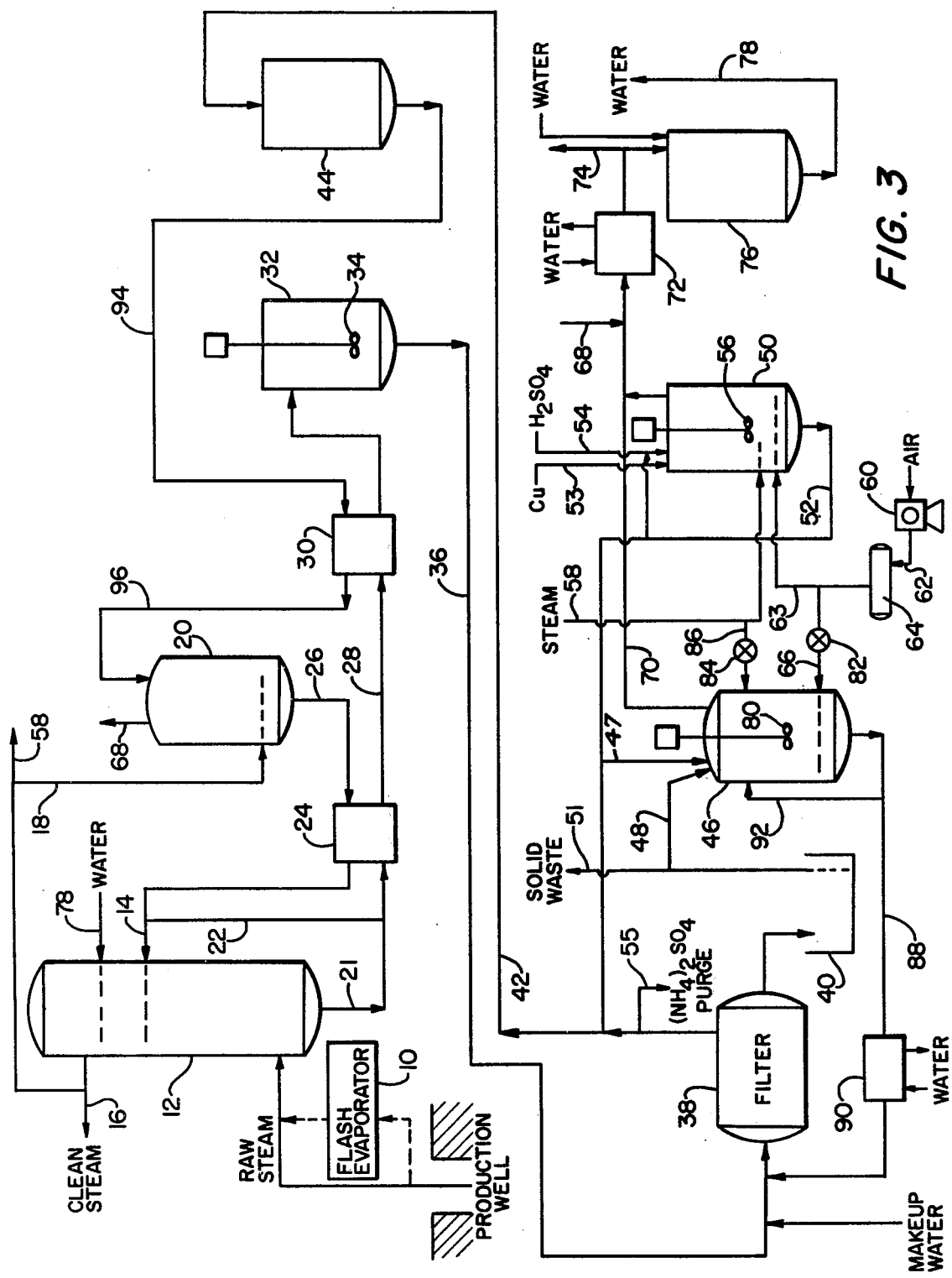
FIG. 3 illustrates a preferred form of the invention for reducing H$_2$S emissions from a geothermal power plant where the geothermal steam contains more than about 100 ppm of NH$_3$.

FIG. 3 schematically illustrates a preferred form of process system designed in accordance with this invention for reducing H$_2$S emissions from a geothermal power plant. This form employs a batch regeneration scheme in conjunction with continuous scrubbing but it is understood that regeneration may be done continuously if necessary or desirable. The illustrated system may be employed to handle naturally-occurring geothermal steam or steam derived from a geothermal brine. The steam may be geothermal steam recovered directly from a geyser production well. Alternatively the production well may be a source of geothermal brine, in which case the steam is produced by passing the brine through a flash evaporator 10. In either case the raw steam will contain H$_2$S and other impurities, of which NH$_3$ may be one. This raw steam is passed to a scrubber 12 which may be of any suitable design. The scrubber may be a countercurrent contact device and preferably is in the form of a trayed column or a column packed with metal or ceramic rings or other suitable contact material. Vortex, spray, or venturi type scrubbers of suitable design also may be used. In the illustrated embodiment the steam enters the lower end of the scrubber column, interacts with and is cleaned of H$_2$S by a recycled copper sulfate-ammonium sulfate scrubbing solution introduced via a line 14. The clean steam passes out of the upper end of the scrubber and most of it is conducted via a line 16 to a power plant where it is used to drive an electrical generator either directly or indirectly by exchange of heat with another working fluid. The remainder of the clean steam is delivered via a line 18 to a deaerator vessel 20 where regenerated copper sulfate scrubbing solution is deaerated by the clean steam.

In the scrubber, hydrogen sulfide is removed from the raw steam by countercurrent contact with the dilute copper sulfate-ammonia sulfate scrubbing solution. Ammonia in the raw steam is converted to ammonia sulfate. The hydrogen sulfide is converted to copper sulfide and so the purge steam removed from the bottom end of the tower by line 21 comprises an acidic copper sulfate-ammonium sulfate and copper sulfide slurry. Part of this slurry is recycled back to the upper end of the tower via a line 22 and line 14. The remainder of the slurry is passed through an energy recovery heat exchanger 24 where it gives up heat to the deaerated scrubbing solution which passes out of the vessel 20 to the scrubber via a line 26, exchanger 24 and line 14. This same slurry stream is passed by a line 28 through another energy recovery heat exchanger 30, where it is cooled further by exchange of heat with regenerated scrubbing solution, to a surge tank 32. The latter is provided with a motor driven impeller 34 which acts to keep the solids contents of the stream in suspension. The purge slurry is transferred from tank 32 via a line 36 to a liquid/solid separating stage. The latter may be a centrifugal separator but preferably it is a filter unit 38. Since the filter unit is stopped periodically for filter cake removal, the surge tank 32 is made large enough to store all of the slurry that accumulates while the filter is shut down for filter cake removal. The filter cake or sludge is discharged into a sump 40, while some of the filtrate is passed via a line 42 to a regenerated copper sulfate scrubbing solution surge tank 44 and some is directed to reactor 46 via a line 47. The balance of the filtrate is purged to remove soluble impurities, including $(NH_4)_2SO_4$ from the system via line 55. The filter cake is transferred into a regeneration reactor 46, as represented schematically by line 48.

Prior to the transfer of filter cake, the reactor 46 is charged with a makeup acid copper sulfate solution obtained from a copper makeup tank 50 via a line 52. The makeup acid copper sulfate solution is obtained by adding makeup sulfuric acid and makeup precipitate copper into tank 50 via lines 53 and 54 respectively. The copper is kept suspended by action of an agitator 56. Sufficient air and clean steam are sprayed into makeup tank 50 to dissolve the precipitate copper. The resulting acid copper sulfate is transferred via line 52 to regeneration reactor 46 and also, as needed, to surge tank 44 via line 42. The steam is fed to tank 50 via a bleed line 58 that is connected to the scrubbed steam line 18, while air under pressure is provided from a compressor 60 via lines 62 and 63 and a storage tank 64. Air is also supplied to regeneration reactor 46 from tank 64 via a line 66.

Off-gases from de-aerator vessel 20 as well as the off-gases from reactor 46 are fed via lines 68 and 70 through a cooler 72. These off-gases contain a significant amounts of water which is separated from the noncondensables as a result of the cooling experienced in cooler 72. The latter is a heat exchanger which is cooled with water. The uncondensed off-gases are vented to the atmosphere via a line 74 while the water condensate from cooler 72 is accumulated in a tank 76 and transferred therefrom to scrubber 12 via a line 78.

The precipitated copper sulfides in the filter cake are combined in regeneration reactor 46 with the makeup acid sulfate solution introduced by line 52 and kept suspended in that solution by action of a motor driven agitator 80. Sufficient air is sparged into reactor 46 via line 66 to reoxidize the precipitated sulfides to copper sulfate according to reaction (2) above. The required oxygen partial pressure is maintained in the reactor by a suitable pressure control system (not shown) which operates a throttling valve 82 in line 66 and the reactor is held at the required leaching temperature by a temperature control system (also not shown) which sparges steam (which has been cleaned in scrubber 12) to reactor 46 via a throttling valve 84 in line 86 connected to line 58.

At the completion of the regeneration cycle, the liquid and solids contents of reactor 46, comprising regenerated copper sulfate solution and ammonia sulfate, are transferred by line 88 through cooler 90 back to filter 38; a small proportion of the same steam is recycled to reactor 46 via a line 92. Cooler 90 is a water-cooled heat exchanger like cooler 72. The regenerated contents of reactor 46 are returned to filter 38 to effect separation of any remaining solids, e.g., unreacted copper sulfide, which are purged in stream 51.

The regenerated copper sulfate scrubbing solution stored in surge tank 44 is delivered via a line 94 back to cooler 30 where it is heated up by exchange of heat with hot slurry by line 28. The cooler scrubbing solution passes via a line 96 into deaerator vessel 20 where it is deaerated by the hot steam supplied via line 18. This deaerated scrubbing solution is transferred by line 26 to cooler 24 where it is heated up further by the hot slurry carried by line 21.

The surge tanks 32 and 44 are made large enough so that the scrubber may be operated on a continuous basis even though the filter unit 38 and the regeneration vessel 46 are operated on a batch basis. It also is contemplated that the system may consist of more than one regeneration reactor and filter.

Following is an example of how to remove $H_2S$ from steam derived from flash vaporization of a geothermal brine using a process system as illustrated in FIG. 3. Raw steam containing about 220 ppm $H_2S$ and about 200 ppm $NH_3$ is introduced to scrubber 12 at a temperature of about 353° F. and a pressure of about 120 psig at a flow rate of about 100,000 pounds per hour (pph) and scrubbed with a dilute $CuSO_4$ - $(NH_4)_2SO_4$ solution introduced via line 14 at a temperature of about 350° F., a pressure of about 120 psig, a rate of about 200 gallons per minute (gpm), and a pH of about 1.2 at room temperature. It also is scrubbed with water introduced via line 78 at a temperature of about 80° F., a pressure of about 130 psig, and a rate of about 0.7 gpm. Clean steam, i.e., steam with negligible amounts of $H_2S$ and small amounts of $NH_3$, is removed from the scrubber at a temperature of about 347° F., a pressure of about 115 psig, and a rate of about 100,000 pph. About 50 pph of clean steam is fed via line 18 to deaerator vessel 20 while the remainder is withdrawn via line 16 for use in generating electrical power. As required a small amount of clean steam is withdrawn via line 58 and passed to the batch-operated regenerator reactor 46. About 207 gpm of copper sulfate/ammonium sulfate/copper sulfide slurry is withdrawn from the bottom of scrubber 10, with about 6.5 gpm of the slurry being fed to cooler 24 while the remainder is recycled to the scrubber via line 22. The slurry is withdrawn from the scrubber at a temperature of about 350° F. and a pressure of about 120 psig. The slurry is cooled to a temperature of about 285° F. in cooler 24 and is cooled in cooler 30 to about 90° F. The cooled slurry contains about 2.7% sulfide solids, has a composition of approximately 100 g/l $(NH_4)_2SO_4$, 25 g/l $H_2SO_4$, 2 g/l Cu, and has a pH measured at room temperature of about 1.2. The cooled slurry is accumulated in surge tank 32 while the solids are kept in suspension by agitator 34. The regenerated copper sulfate/ammonium sulfate scrub solution containing about 30 g/l Cu, is stored in tank 44 at about 90° F. This solution is withdrawn from tank 44 and fed back to the scrubber via line 94 at a rate of 5.3 gpm. This solution is heated to about 212° F. in cooler 30 and deaerated in aerator vessel 20 by steam which is introduced at the rate of about 50 pph. The deaerated scrubbing solution is fed at a temperature of about 212° F. and a pressure of about 130 pisg to cooler 24 where it is heated to about 350° F. This hot scrubbing solution is fed at a pressure of about 120 psig to the upper end of the scrubber via line 14 as previously described.

The cooled slurry is transferred, batchwise, through filter 38. Some of the filtrate is reserved, in tank 40, for use in regeneration, and the balance, 1800 gal/day, is purged from the system via line 55 to maintain the $(NH_4)_2SO_4$ concentration in the system below 100 g/l.

Regenerator reactor 46 is operated batchwise, with each batch of sulfide being about 2130 pounds. For each batch, 100 gallons of makeup copper sulfate solution is fed from tank 50 to regenerator reactor 46 via line 52 at a temperature of about 130° F. Thirty pounds to makeup precipitate copper and 8 gallons of makeup $H_2SO_4$ are delivered to tank 50 via lines 53 and 54, and water as required is added to tank 76. Air is supplied to reactor 46 at a temperature of 120° F., a pressure of 120 psig, and a rate of 200 SCFM. Air is also supplied to tank 50 as required at a temperature of 120° F. and a pressure of about 20 psig. Steam is supplied to reactor 46 at a temperature of about 347° F. and a pressure of about 115 psig in the amounts required to maintain the temperature within the reactor at about 100° C. Under these conditions the oxygen pressure within the reactor is about 20 psia and the leaching reaction is according to reaction (2) above. The regenerated solution is withdrawn from reactor 46 at a temperature of about 212° F. and a pressure of about 60 psig. It is cooled by cooler 90 to a temperature of about 100° F. and passes into the filter at a pressure of about 30 psig. The filtrate, containing about 30 g/l Cu and 8 g/l $H_2SO_4$, is delivered to surge tank 44 at a temperature of about 90° F. and about atmospheric pressure. About 30 lb/batch of leach residues and insoluble impurities are removed in filter 38 and purged from the system in line 51.

The foregoing system can be designed to treat steam containing as little as 20 ppm and as much as several percent $H_2S$ and about the same range in $NH_3$ so as to produce a clean steam which contains a few ppm $H_2S$ and $NH_3$.

In the preceding example, the steam to be treated contained nearly sufficient $NH_3$ to neutralize the acid formed in the scrubbing reaction according to reaction (9) above. In many cases, however, there may be insufficient $NH_3$ in the steam, relative to the amount of $H_2S$ present, to neutralize the acidity to an extent sufficient to maintain the pH within the desired range. In these cases, it is desirable to introduce a neutralizing agent into the system to control the pH in a range where high degrees of $H_2S$ removal are obtained.

Figure 4:
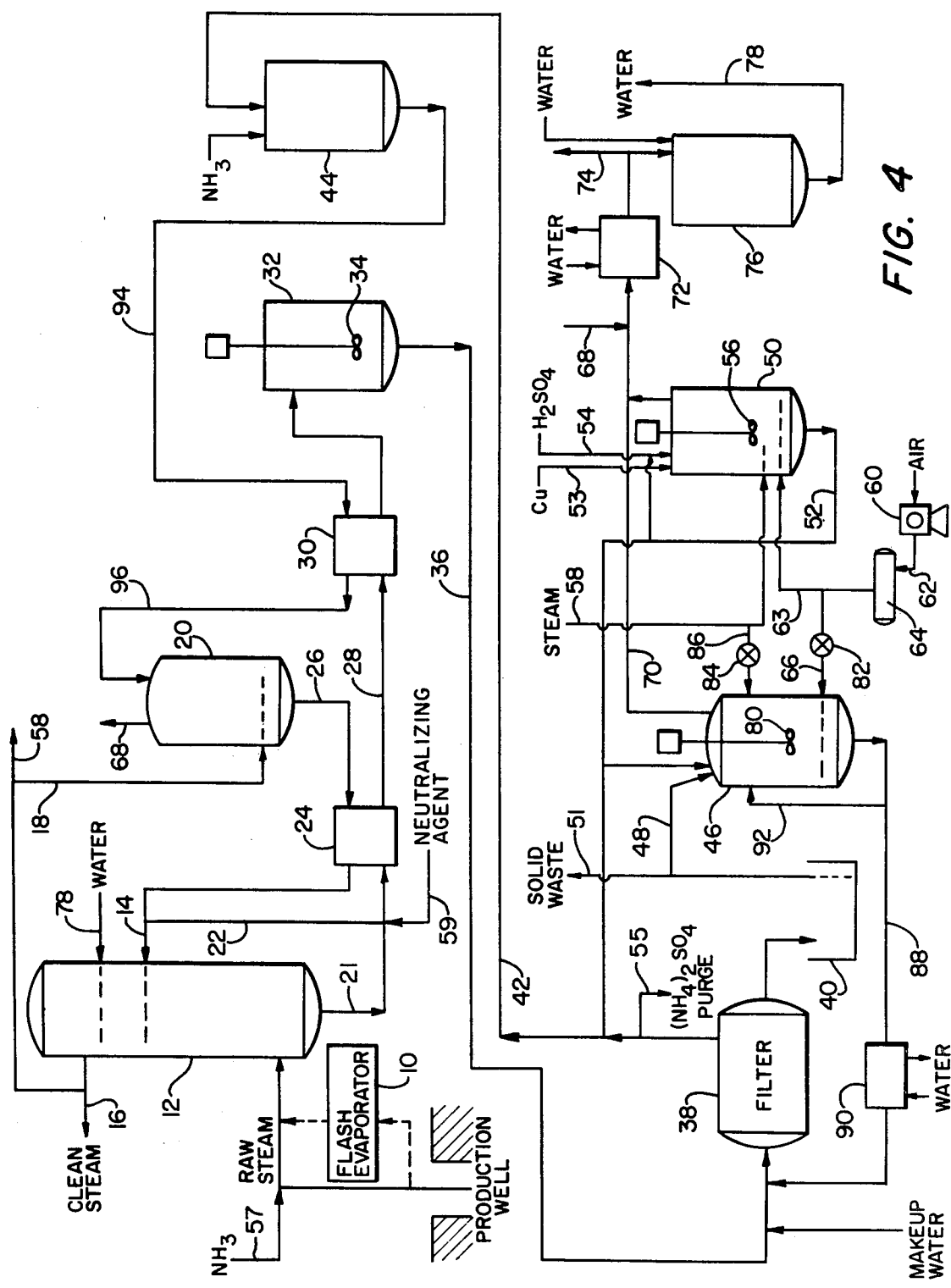
FIG. 4 shows a system similar to that of FIG. 3 for treating geothermal steam with a relatively low NH$_3$/H$_2$S ratio, e.g. less than about 100 ppm of NH$_3$.

FIG. 4 schematically illustrates a preferred form of process systems designed in accordance with this invention for reducing $H_2S$ emissions from a geothermal power plant using steam which has a low ratio of $NH_3/H_2S$. The system of FIG. 4 is substantially the same as that of FIG. 3 except that $NH_3$ may be added directly to the raw steam via line 57, or $NH_3$ may be added to the recycled acidic copper sulfate-ammonium sulfate and copper sulfide slurry via line 59. Ammonia may also be added directly to the regenerated copper sulfate solution surge tank 44, providing that its addition does not cause precipitation of copper salts otherwise intended for recycle to scrubber 12.

Following is an example of how to remove $H_2S$ from geothermal steam containing a low ratio of $NH_3/H_2S$ using a process system as illustrated in FIG. 4. Raw steam containing about 130 ppm $H_2S$ and about 10 ppm $NH_3$ is introduced to scrubber 12 at a temperature of about 353° F. and a pressure of about 120 psig at a flow rate of about 100,000 pounds per hour (pph). Ammonia gas at a temperature of about 100° F. and a pressure of about 120 psig is introduced to the raw steam upstream of the scrubber through line 57 at a rate of about 7 pounds per hour. The mixture is scrubbed with a dilute copper sulfate/ammonium sulfate solution with a pH measured at room temperature of about 1.1 introduced via line 14 at a temperature of about 350° F., a pressure of about 120 psig and a rate of about 200 gallons per minute (gpm). It also is scrubbed with water introduced via line 78 at a temperature of about 80° F., a pressure of about 130 psig, and a rate of about 1.6 gpm. Clean steam, i.e., steam with small amounts of $H_2S$ and $NH_3$, is removed from the scrubber at a temperature of about 347° F., a pressure of about 115 psig, and a rate of about 100,000 pph. About 50 pph of clean steam is fed via line 18 to deaerator vessel 20 while the remainder is withdrawn via line 16 for use in generating electrical power. As required a small amount of clean steam is withdrawn via line 58 and passed to the batch-operated regenerator reactor 46. About 208 gpm of copper sulfate/copper sulfide slurry is withdrawn from the bottom of scrubber 10, with about 8.1 gpm of the slurry being fed to cooler 24 while the remainder is recycled to the scrubber via line 22. The slurry is withdrawn from the scrubber at a temperature of about 350° F. and a pressure of about 120 psig. The slurry is cooled to a temperature of about 285° F. in cooler 24 and is cooled in cooler 30 to about 90° F. The slurry contains about 1.2% sulfide solids and has a composition of approximately 25 g/l $(NH_4)_2SO_4$, 10 g/l $H_2SO_4$, 2 g/l Cu, and has a pH of about 1.1. The cooled slurry is accumulated in surge tank 32 while the solids are kept in suspension by agitator 34. The regenerated copper sulfate/ammonium sulfate scrub solution, containing about 15 g/l Cu, is stored in tank 44 at about 90° F. Scrub solution is withdrawn from tank 44 and fed back to the scrubber at a rate of 5.8 gpm. This solution is heated to about 212° F. in cooler 30 and deaerated in aerator vessel 20 by steam which is introduced at the rate of about 50 pph. The deaerated scrubbing solution is fed at a temperature of about 212° F. and a pressure of about 130 psig to cooler 24 where it is heated to about 350° F. This hot scrubbing solution is fed at a pressure of about 120 psig to the upper end of the scrubber via line 14 as previously described.

The cooled slurry is transferred, batchwise, through filter 38. Some of the filtrate is reserved in tank 40 for use in regeneration, and the balance, 3300 gal/day, is purged from the system via line 50 to maintain the $(NH_4)_2SO_4$ concentration in the system below 25 g/l.

Regenerator reactor 46 is operated batchwise, with each batch of sulfide being about 1200 pounds. For each batch 200 gallons of makeup copper sulfate solution is fed from tank 50 to regenerator reactor 46 via line 52 at a temperature of about 130° F. Sixty pounds of makeup precipitate copper and 6 gallons of makeup $H_2SO_4$ are delivered to tank 50 via lines 53 and 54, and water as required is added to tank 76. Air is supplied to reactor 46 at a temperature of 120° F., a pressure of 120 psig, and a rate of 150 SCFM. Air is also supplied to tank 50 as required at a temperature of 120° F. and a pressure of about 20 psig. Steam is supplied to reactor 46 at a temperature of about 347° F. and a pressure of about 115 psig in the amounts required to maintain the temperature within the reactor at about 100° C. Under these conditions the oxygen pressure within the reactor is about 20 psia and the leaching reaction is according to reaction (9) above. The regenerated solution is withdrawn from reactor 46 at a temperature of about 212° F. and a pressure of about 60 psig. It is cooled by cooler 90 to a temperature of about 100° F. and passes into the filter at a pressure of about 30 psig. The filtrate, containing about 15 g/l Cu and 3 g/l $H_2SO_4$, is delivered to surge tank 44 at a temperature of about 90° F. and about atmospheric pressure. About 20 lb/batch of leach residues and insoluble impurities are removed in filter 38 and purged from the system in line 51.

The advantages of the above-described steam treating processes are important. For one thing, they make use of commercially available equipment and established techniques. Secondly, the scrubbing operation is simple and economically satisfactory since a substantially closed loop is provided for the scrubbing medium. Thirdly, regeneration by leaching is easily controlled and relatively cheap to accomplish. Fourthly, the system can be scaled up or down according to the quantity of raw steam that is available and the amount of clean steam that is to be made available for electrical power generation. Finally, the system does not introduce any impurities or otherwise create any pollution or other environmental problems, e.g., solid wastes which must be disposed in sanitary land fills or vented off-gases that must be scrubbed. Other advantages will be obvious to persons skilled in the art.

2. Application to Scrubbing of Fuel Gases

Figure 5:
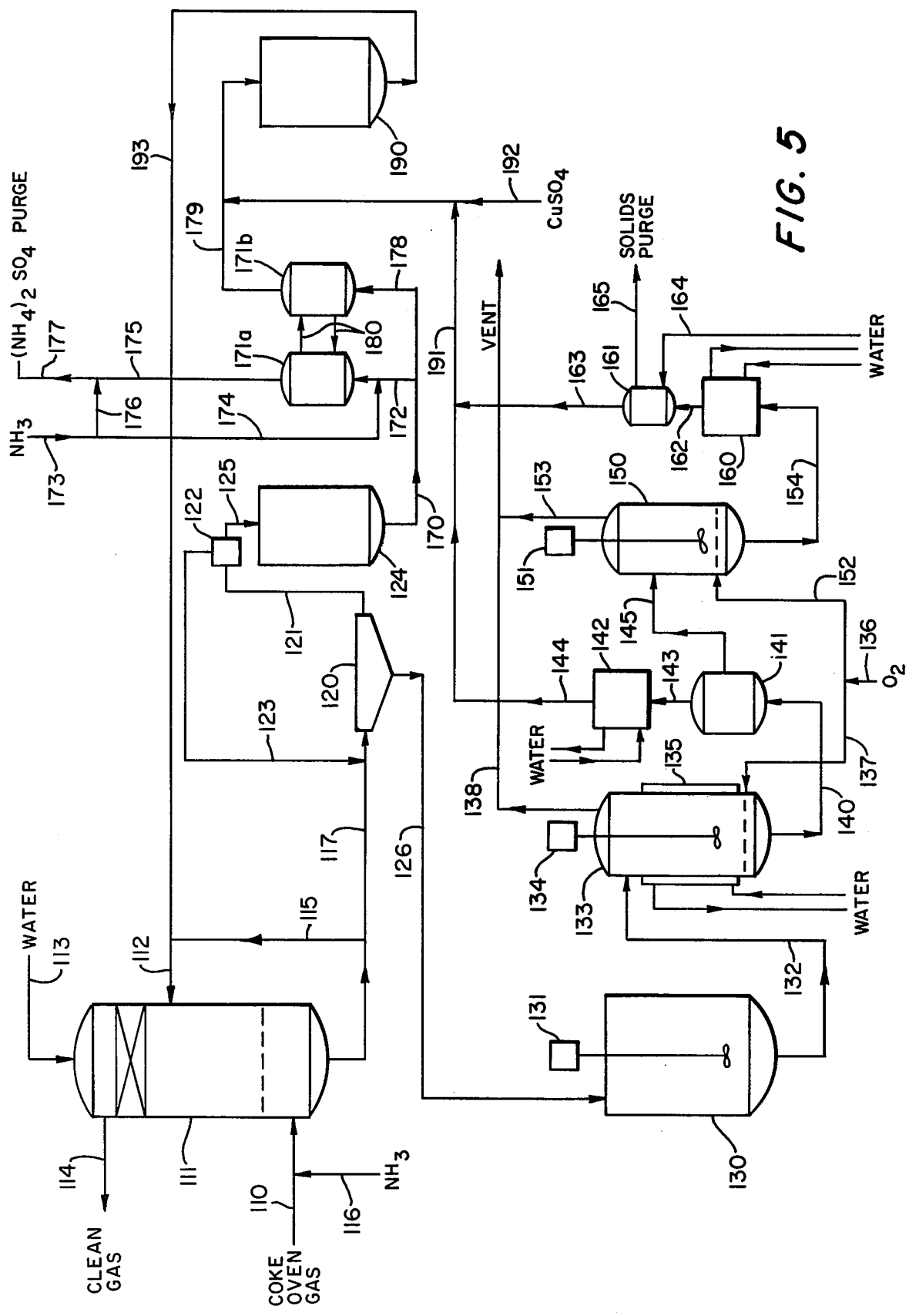
FIG. 5 illustrates a preferred form of system for scrubbing fuel gases in accordance with this invention.

An example of application of the process to scrubbing of fuel gases is shown in FIG. 5 which schematically illustrates a preferred form of a system designed in accordance with this invention for reducing the $H_2S$ content to coke oven gases. This form employs a process sequence involving continuous scrubbing, liquid-solid separation, regeneration, and purge stream decopperization operations. The system of FIG. 5 may be employed to handle gases produced when coking coals with a wide variety of compositions or, more broadly, to handle any gas stream containing $H_2S$ in the presence of $CO_2$ and other acidic and $NH_3$ and other basic constituents. In any case, the gases to be treated will contain $H_2S$ and other impurities, of which $NH_3$ may be one, and will be saturated with water vapor at the temperature and pressure at which $H_2S$ removal is to take place.

Coke oven gas which has passed through a primary cooler, exhauster, and electrostatic precipitation for tar removal still contains $H_2S$, $NH_3$ and other impurities. This raw gas is passed via a line 110 to a scrubber 111 which may be of any suitable design. The scrubber may be a countercurrent contact device such as a packed, trayed, or shower column, or a co-current device such as a venturi scrubber. The only requirements for the scrubber are that it provide adequate gas-liquid contact and handle solids precipitated in the scrubbing reaction without fouling or other operating problems. In the illustrated embodiment, the raw gas enters the lower end of the scrubbing column and is contacted and cleaned of $H_2S$ by a recycled copper sulfate-ammonium sulfate scrubbing solution introduced via line 112. The clean gas passes to the upper end of the scrubber where it is washed with water introduced by line 113 to remove entrained scrub solution and particulates. The clean, entrainment-free gas passes via line 114 to subsequent purification steps for removal of other coal tar chemicals prior to being combusted to supply process energy.

Hydrogen sulfide is removed from the raw gas by precipitation as copper sulfide from a recirculating copper sulfate-ammonium sulfate solution. Adequate gas-liquid contact is obtained by recirculating the necessary amount of solution from the scrubber bottom via line 115 to be mixed with the required amount of makeup $CuSO_4$ solution in line 112. The sulfuric acid which is formed as a by-product of the precipitation reaction which removes $H_2S$ from the raw gas is partially neutralized by the $NH_3$ which is also contained in the gas. If additional neutralization is required to maintain the scrub solution pH in the optimal range for $H_2S$ removal, it can be obtained by introducing additional $NH_3$ into the raw gas via line 116. Sufficient acidic ammonium sulfate-copper sulfate-copper sulfide slurry is purged from the recirculating scrub solution via line 117 to remove the sulfide solids from the scrubber 111 at a rate just equal to that at which they are formed in the scrubbing reaction.

The purge slurry in line 117 passes to a liquid-solid separation device 120 of appropriate design. This device may be a continuous or batch filter or centrifuge, decanter, thickener or other type of device, the only requirement being that it separate the purge slurry into a more concentrated slurry stream for regeneration and a soluble purge stream which is substantially free of solids. In the illustrated embodiment the liquid-solid separation device 120 preferably is a continuous thickener. The thickener overflow passes via line 121 to a polish filter 122 for removal of fine solids, which are recycled back to the thickener inlet via line 123. The clarified thickener overflow is directed to a soluble purge surge tank 124 via line 125. The now concentrated solids from the slurry carried by purge line 117 pass from thickener 120 via line 126 to slurry surge tank 130.

Surge tank 130 serves to isolate the scrubbing operation from the regeneration operation and thereby provides process flexibility. The solids are kept in suspension by agitator 131, and the slurry is transferred, via line 132, to pressure leach reactor 133 where the solids are hydrothermally regenerated to form copper sulfate for recycle. The reactor is provided with an agitator 134 which serves both to keep solids in suspension and to promote intimate mixing of the slurry and the oxidant. The oxidant may be air under pressure, air enriched with oxygen under pressure, or substantially pure oxygen under pressure, and is admitted to the reactor via line 137. Non-reacting gases, such as nitrogen, are removed from the reactor and vented by line 138. The reactor is provided with a water cooled jacket 135 to remove the exothermic heat of reaction generated when copper sulfides are converted to copper sulfate and thus allows the reaction temperature to be controlled at an optimal value. The regeneration reactor 133 may be of any suitable type or a plurality of reactors or reactors of staged design may be used. The only requirements for its design are that (a) a means of solids suspensions and gas dispersion be provided, (b) the vessel size be sufficient to provide adequate retention time for the slurry to allow the regeneration reaction to go essentially to completion, and (c) it be capable of maintaining the desired regeneration pressure and temperature. No matter what detailed design is used for the regeneration reactor, however, it must be anticipated that a small amount of copper sulfide solids will pass through the reactor without being fully regenerated.

The effluent from reactor 133, containing regenerated $CuSO_4$, unreacted copper sulfide solids, and insoluble impurities scrubbed from the raw gas, pass via line 140 to filter 141. The filtrate from filter 141, substantially free of solids, passes to a water cooled heat exchanger 142 via line 143. The cooled filtrate, which constitutes the bulk of the regenerated $CuSO_4$ solution, is recycled to the process via line 144. The unregenerated copper sulfide solids and insoluble impurities removed from stream 140 by filter 141 pass via line 145 to a polish leach pressure reactor 150.

The function of polish leach pressure reactor 150 is to subject the unleached residues from regeneration reactor 133 to a final hydrothermal pressure leach step in order to insure that all sulfide solids formed in scrubber 111 are oxidized and converted to soluble $CuSO_4$, which can then be separated from the insoluble impurities scrubbed from the raw gas. Polish leach reactor 150 is of the same general design as regeneration reactor 133, except that it need not be fitted with a cooling jacket (since the exothermic heat of reaction is small)

and indeed may be fitted with a steam heated jacket to raise the temperature of the slurry from filter 141 still further if desired. An agitator 151 is provided to suspend solids and to achieve adequate contact between the slurry contents of reactor 150 and the oxidant admitted via line 152. Air, oxygen enriched air, or substantially pure oxygen under pressure may serve as oxidants, with non-reacting gases being vented from the reactor via line 153 as required.

The liquid effluent from polish leach reactor 150, containing additional $CuSO_4$ for recycle and insoluble impurities, is transferred to water cooled heat exchanger 160 via line 154. The cooled reactor effluent passes to washing filter 161 via line 162 and the filtrate, containing $CuSO_4$, is recycled to the process. Solid impurities are washed free of copper by water introduced to filter 161 by line 164 and are removed from the filter and sent to solid waste disposal via line 165.

The solids-free soluble purge stream contained in surge tank 124 still contains the concentration of copper sulfate and ammonium sulfate which was required in the scrubber 111 to achieve efficient removal of $H_2S$ from the raw gas. This copper must be removed and recycled to the process for both economic and environmental reasons. This can be done in a variety of ways, including solid or liquid ion exchange, electrolysis, or precipitation. The only requirements for this operation are that the removal of copper be substantially complete and that consumption of other materials, supplies and energy and the generation of additional waste products be minimized. Preferably as in the illustrated embodiment, the soluble purge stream is passed to an ion exchange decopperization stage by line 170. The ion exchange stage consists of extraction and stripping steps taking place in vessels 171a and 171b respectively, with communication of the ion exchange agent between those steps taking place via lines 180. The extraction and stripping steps may take place in single stages or in a multiplicity of stages and may be carried out either batchwise or continuously using either solid or liquid ion exchange agents.

In the system of FIG. 5, the purge stream in line 170 is divided into two portions: the majority carried by line 172 is neutralized in vessel 171a to obtain the proper pH for extraction of the contained copper. Any convenient neutralizing agent may be used, including ammonia. This agent is introduced to the portion of the purge stream to be decopperized in vessel 171a by means of line 174. Additional neutralizing agent may be added to the decopperized purge solutions in line 175 via line 176, and the neutralized, decopperized purge stream containing $(NH_4)_2SO_4$ and other soluble impurities removed from the raw gas is sent to further treatment by line 177. Ammonium sulfate may be removed from the stream in line 177 by evaporation and crystallization to produce a saleable by-product. The ion exchange agent is stripped of the copper removed from stream 172, by contacting it with the unneutralized portion of the purge stream carried by line 178, in the stripping step carried out in vessel 171b. The stripped, strong copper solution contain ammonia sulfate is directed to recycle copper sulfate surge tank 190 via line 179.

The regenerated copper sulfate/ammonium sulfate solutions from reactors 133 and 150 are directed via lines 144 and 163 to line 191 which leads to surge tank 190. Makeup $CuSO_4$ is added to tank 190 via line 192 to offset small amounts lost in the clean gas (stream 114) and in the solid and soluble purges (streams 165 and 177). The amount of $CuSO_4$ required to remove $H_2S$ from the raw gas in scrubber 111 is transferred from surge tank 190 by line 193 to be mixed with recycled scrubbing solution in line 115 and introduced to the scrubber by line 112.

Following is an example of how to remove $H_2S$ from coke oven gas using a process system as illustrated in FIG. 5. The flow rate and composition of the raw gas stream in line 110 are given below:

| RAW COKE OVEN GAS FLOW RATE AND COMPOSITION | |
|---|---|
| Gas flow rate | 60,000,000 SCFD |
| Gas pressure | 1.25 atm |
| Gas temperature | 165° F. |
| Gas composition | 5 gr/SCF $H_2S$ |
| | 2.5 gr/SCF $NH_3$ |
| | 0.1 gr/SCF particulates |
| | 20 gr/SCF $H_2$ |
| | 103 gr/SCF $CH_4$ |
| | 33 gr/SCF CO |
| | 17 gr/SCF $CO_2$ |
| | 27 gr/SCF $N_2$ |
| | 22 gr/SCF $C_2H_4$ |
| Gas molecular weight (dry) | 12.5 lb/lb mole |

In this case, there is not enough $NH_3$ in the raw gas to neutralize sufficient acid formed as a by-product of the $H_2S$ removal reaction to maintain the pH of the scrub solution in the desired range for optimal removal of $H_2S$, and thus use of additional external neutralizing agent is required. The required scrub solution pH of about 1.7 at room temperature is obtained by adding $NH_3$ through line 116 at a rate of 700 lb/hr, which is sufficient to increase its content in the gas fed to the scrubber to 4.5 gr/SCF.

The raw coke oven gas is saturated with water vapor at a partial pressure which corresponds to conditions in the primary cooler (not shown) and will have been superheated somewhat in passing through the exhauster (not shown). The raw gas will come to thermal equilibrium in the scrubber at a condition in which the exothermic heat of the scrubbing reaction and sensible heat given off in cooling the gas and makeup copper sulfate streams offset the endothermic heat of vaporization of water needed to resaturate the gas. In this case, the coke oven gas will be reduced in pressure to 1.1 atmospheres pressure and in temperature to about 135° F. in passing through the scrubber 111 prior to being conducted to other process steps via line 114. Washing the $H_2S$-free gases with approximately 78 gpm of water supplied by line 113 will both free it of entrainment and supply water needs to offset evaporation.

A flow of about 1000 gpm of scrub solution is continuously withdrawn from the bottom of scrubber 111 and about 715 gpm is recycled via line 115 to provide suitable gas-liquid contact. A purge slurry of approximately 285 gpm containing about 4.1% sulfide solids is withdrawn at 135° F. via line 117. The scrub solution recirculated to scrubber 111 via line 115 has a temperature of 135° F., contains about 200 g/l $(NH_4)_2SO_4$, 17 g/l $H_2SO_4$ and 2 g/l Cu, and has a pH measured at room temperature of about 1.7 which will provide a high degree of $H_2S$ removal efficiency. The solids delivered by the slurry in line 117 are settled in thickener 120 to provide a thickened slurry containing about 5.6% solids. This solids-containing stream, about 210 gpm containing approximately 5900 lb/hr sulfide solids and insoluble impurities removed from the raw gas, passes via line 126 to slurry surge tank 130. The slurry is transferred from the surge tank via line 132 to regeneration reactor 133 which operates at a temperature of 270° F., an oxygen partial pressure of about 125 psia and a total pressure of 150 psig.

In this case, the exothermic heat of reaction is just sufficient to raise the temperature of the slurry in line 132 to the desired value in reactor 133, so that use of cooling jacket 135 is not required. The necessary total pressure is obtained by a pump on line 132 (not shown) and by the pressure of the oxygen fed to the regeneration and polish leach reactors via line 136 at a total rate for both reactors of about 40 tons/day. Under these conditions, the majority of the copper sulfide fed to the reactor via stream 132 is regenerated to copper sulfate in a residence time of about 1-1½ hours, and the reactor contents are transferred to filter 141 at a rate of approximately 210 gpm. The reactor effluent contains about 100 lb/hr of unreacted solids and insoluble impurities and has a composition of about 200 g/l $(NH_4)_2SO_4$, 40 g/l Cu, and 4 g/l $H_2SO_4$. The solids constituents are directed, along with about 10 gpm of filtrate which serves to backwash the filter, to polish leach reactor 150 via line 145. The balance of the filtrate, about 200 gpm, is cooled to approximately 190° F. in cooler 142 and then returned to surge tank 190 via line 144.

The solid residues from reactor 133 are releached in reactor 150 at about 250° F. under an oxygen partial pressure of about 135 psia and a total pressure of 150 psig to separate the inert, insoluble impurities removed from raw gas from residual unregenerated copper sulfides. The polish leach reactor effluent, containing about 50 lb/hr of solids, passes via line 154 to cooler 160 where its temperature is reduced to 190° F. The cooled effluent passes to filter 161 via line 162 at a rate of 10 gpm. The solids are removed and the filtrate is directed to surge tank 190 by line 163. The solids in filter 161 are washed with about 10 gpm of water supplied by line 164, and a solids purge of about 10 gpm containing 1% insoluble impurities plus unregenerated copper sulfide solids is sent to waste treatment via line 165.

The overflow from thickener 120 passes via line 121 to filter 122 which removes suspended solids and returns them, at a rate of approximately 1 gpm in a 1% slurry, to the thickener via line 123. The filtrate is directed to surge tank 124 by line 125 at a rate of approximately 75 gpm. The majority of this stream, about 60 gpm, passes to the extraction step of the copper recovery operation via line 172. Prior to extraction, however, its pH is made substantially neutral by the addition of about 170 lb/hr of $NH_3$ supplied via line 174. An additional 30 lb/hr of $NH_3$ is added to the decopperized purge stream in line 175 via line 176, so that the soluble purge stream in line 177 contains approximately 225 g/l $(NH_4)_2SO_4$ and trace amounts of copper and is substantially neutral.

The balance of the filtrate from the stream in line 170, about 15 gpm, is directed to the stripping step of the copper recovery operation via line 178. Here, it recovers copper from the ion exchange agent and is recycled to surge tank 190 via line 179 with a composition of approximately 200 g/l $(NH_4)_2SO_4$, 4 g/l $H_2SO_4$, and 10 g/l Cu and a temperature of 135° F. Approximately 10 lb/hr of $CuSO_4$ is also added to surge tank 190 via line 192 to offset miscellaneous losses of copper from the system.

The regenerated, recovered, and makeup $CuSO_4$ streams from lines 144, 163, 179 and 192 are mixed in surge tank 190 and returned to the scrubber via line 193 at a rate of about 225 gpm. This stream, at a temperature of about 180°, with a composition of 200 g/l $(NH_4)_2SO_4$, 40 g/l Cu, and 4 g/l $H_2SO_4$, and a pH measured at room temperature of about 2.2, is mixed with recycled scrub solution from line 115 and enters the scrubber via line 112 where it supplies the necessary flow of copper to remove $H_2S$ from the incoming raw gas.

It is to be understood that this system is susceptible to various changes. Thus, for example, the process conditions such as temperatures, pressures and flow rates may be adjusted as required for different feed streams or because of particular equipment design features. Similarly additional equipment such as additional heat exchangers and valves may be introduced into the system for reasons of efficiency, economy, control or safety.

It is to be appreciated that the process of this invention may also be used to remove hydrogen sulfide from steam obtained from other than geothermal sources and also from gas streams other than steam and coke oven gases, including a mixture of gases saturated with water vapor (it is to be noted that steam containing hydrogen sulfide and/or other gases may be viewed as a gas stream saturated with water vapor, even though the concentration of gas in the steam is relatively low). By way of example, the invention may be used to remove $H_2S$ (and ammonia) from a Fischer-Tropsch reaction effluent or from gas streams derived from various petrochemical cracking and synthesis processes. Still other modifications and applications will be obvious to persons skilled in the art.

What is claimed is:

1. A process for removing hydrogen sulfide from a gas stream also containing ammonia, comprising
    establishing a recirculating liquid stream comprising a liquid solution of a scrubbing agent consisting essentially of copper sulfate, said stream being buffered to an acidic pH with ammonium sulfate, said pH being sufficiently acidic to prevent the precipitation of copper as hydroxide or basic hydrated oxides at the operating conditions,
    contacting said liquid stream with said gas stream to react said copper sulfate with said hydrogen sulfide to precipitate copper sulfide, and
    removing copper sulfide precipitate from said recirculating liquid stream.

2. The process of claim 1 wherein at least a portion of said ammonium sulfate is formed from the ammonia in the gas stream.

3. The process of claim 1 wherein additional ammonia is added to control the pH during the contacting.

4. The process of claim 1 wherein said gas stream is geothermal steam or geothermally derived steam.

5. The process of claim 1 wherein said gas stream is coke oven gas.

6. The process of claim 1 wherein ammonium sulfate is removed from the recirculating liquid stream.

7. The process of claim 1 wherein said pH is no higher than 3 measured at room temperature.

8. The process of claim 7 wherein said pH is between 1 and 3 measured at room temperature.

9. The process of claim 8 wherein additional ammonia is added to control the pH during the contacting.

10. The process of claim 1 further comprising hydrothermally oxidizing said copper sulfide to regenerate copper sulfate.

11. The process of claim 10 further comprising returning said regenerated copper sulfate to said liquid stream.

* * * * *